May 3, 1966  G. F. QUAYLE  3,249,170
MOTORIZED LIFT TRUCK
Filed Nov. 7, 1963  3 Sheets-Sheet 1
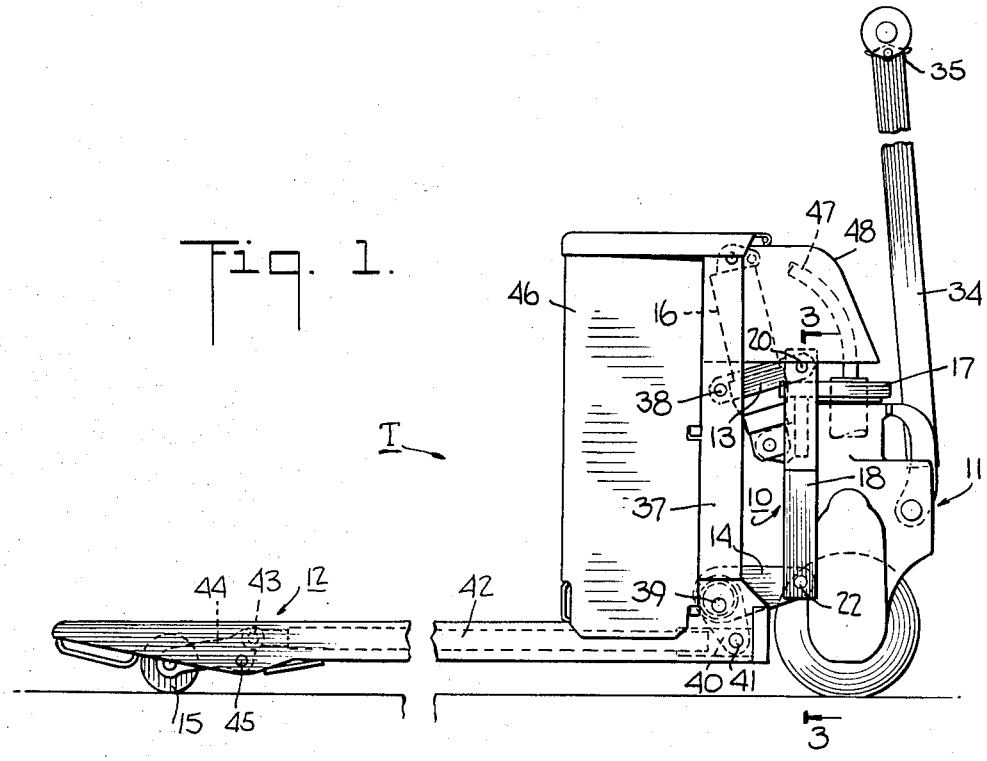
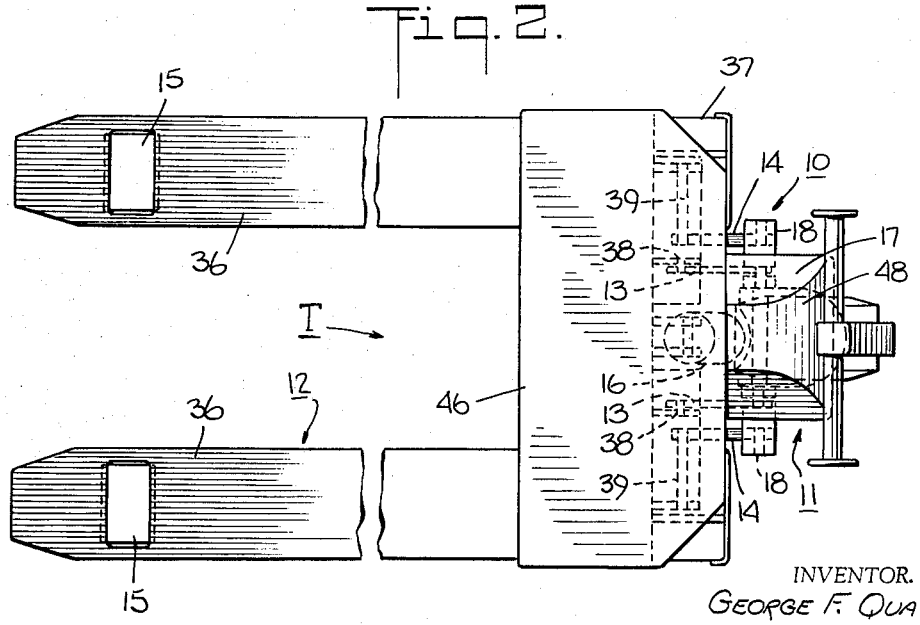
INVENTOR.
GEORGE F. QUAYLE
BY
ATTORNEY

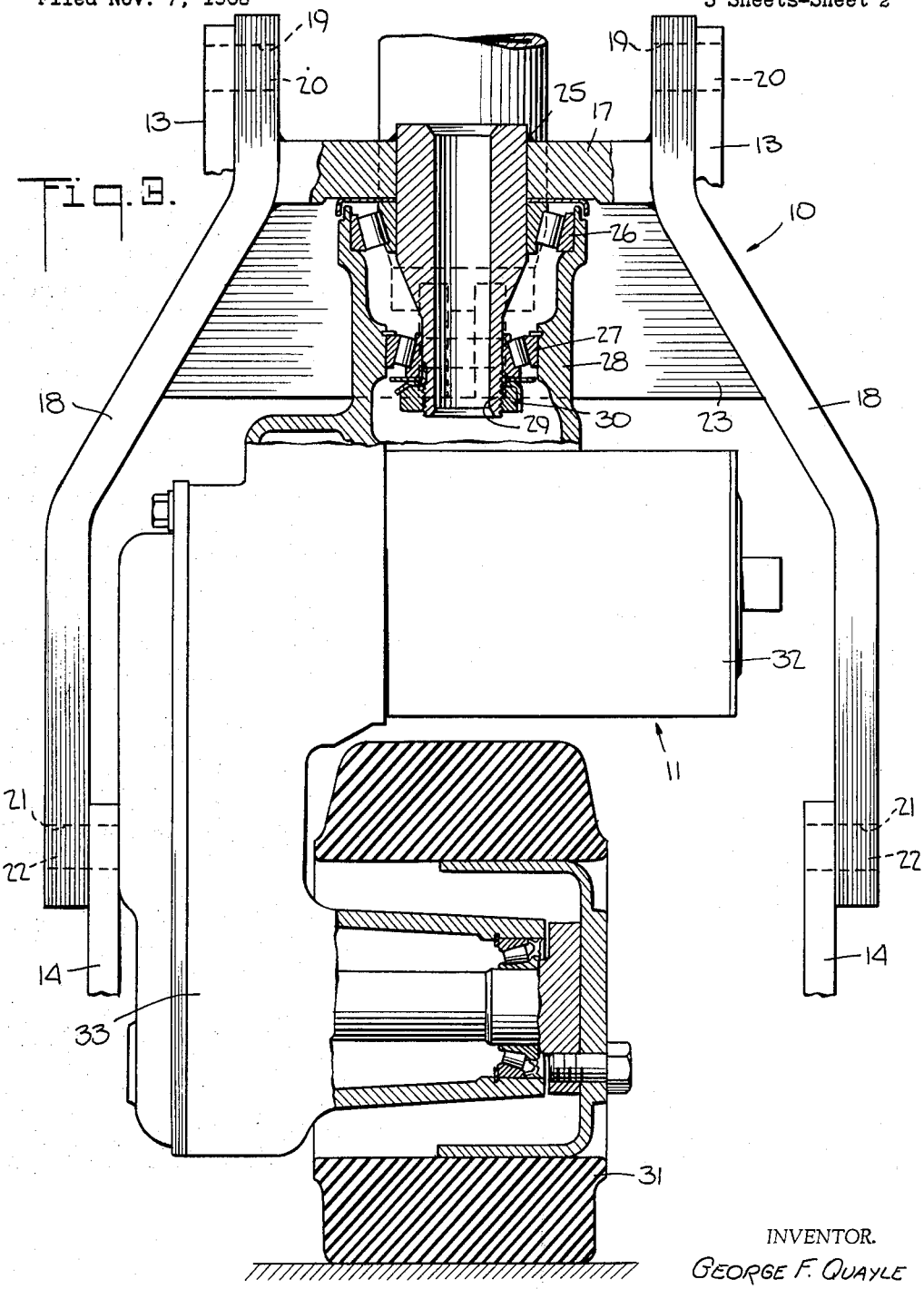

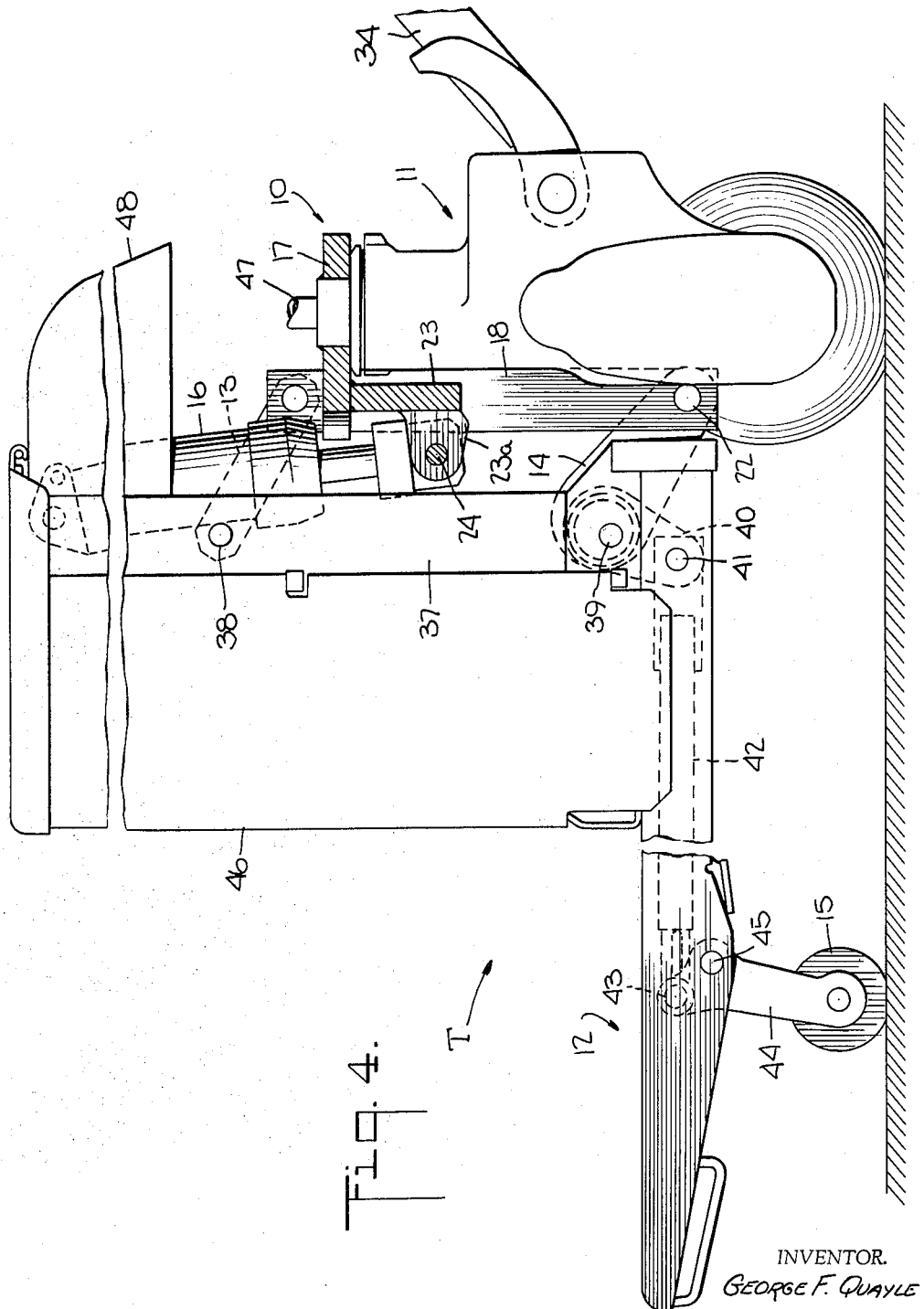

United States Patent Office 3,249,170
Patented May 3, 1966

3,249,170
MOTORIZED LIFT TRUCK
George F. Quayle, Philadelphia, Pa., assignor to Yale & Towne, Inc., Cleveland, Ohio, a corporation of Ohio
Filed Nov. 7, 1963, Ser. No. 322,181
7 Claims. (Cl. 180—19)

This invention relates to an industrial truck, and more particularly, to an industrial truck having a motorized front end drive.

Trucks of the particular class are very old in the art, and there are numerous patents disclosing varying constructions. The concept that I shall set forth in this application, and on which the truck of my invention is based, relates to a particular construction making it possible to contribute a truck that is extremely simple in form, and which, therefore, makes possible the manufacture and sale of a motorized truck at a price that is very little more than a truck of the particular class that is not motorized.

Thus, the truck that I have conceived utilizes an extremely simple forward frame construction that lends itself very well to the mounting of the steering and traction unit, while at the same time permitting the assembly thereof to a load frame, and to lifting mechanism extending between the load frame and said forward frame. In essence, the forward frame is formed as an inverted U and, preferably, is formed of simple bars or strips that are welded together to form this inverted U. The base of the inverted U is readily adapted for the mounting of the steering and traction unit, and may take the form of a horizontal bar welded to the struts or legs forming the inverted U. Because of the bar construction of the legs of the inverted U, it is possible to pivot upper and lower links to each of the bars at each side of the inverted U, these legs extending to a conventional load lifting frame.

Further, the assembly of the legs to the inverted U-frame is facilitated by the upward extension of portions of the bars somewhat beyond the horizontal connecting member or bar. Still further, it is possible to extend from this horizontal connecting member or bar a depending member for the mounting of a ram that is positioned between the depending member and the load lifting frame for swinging the load lifting frame on the links relatively to the forward frame.

It will thus be appreciated that through the utilization of a very simple and functional U-frame, formed in a most economical manner by the use of bar or strips, I can fabricate the essential forward end of a motorized truck in an extremely economical manner, making possible the contribution of a motorized truck at very slightly more than the selling price of a simple hand lift truck. All of this will appear rather clearly to those skilled in this art and who are well aware of the earlier constructions in this art, and who will understand therefore the very considerable contribution that is made through my concept hereinafter set forth in detail.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

FIG. 1 is a side elevational view of a motorized hand lift truck constructed in accordance with the invention;

FIG. 2 is a top plan view of the truck shown in FIG. 1;

FIG. 3 is a sectional view taken on the line 3—3 of FIG. 1; and

FIG. 4 is an enlarged side elevational view, partly in section, showing the load lifting elevating frame in raised position.

Referring to the drawings, and in particular to FIGS. 1 and 2, there is shown a motorized hand lift truck T constructed in accordance with my invention.

The truck T includes a forward main frame 10, a combined steering and traction unit 11 which is mounted for steering rotation relatively to the main frame 10, and a load lifting or elevating frame 12. The load lifting frame 12 is supported at its forward end on the main frame 10 through laterally spaced pairs of upper and lower parallel links 13 and 14 which extend between and are pivotally attached at their opposite ends to the load lifting frame 12 and the main frame 10, respectively. The rear end of the load lifting frame 12 is supported by roller 15 which pivot downwardly when the load lifting frame 12 is elevated. A hydraulic ram 16, extending between the forward end of the load lifting frame 12 and the main frame 10, serves to elevate the forward end of the load lifting frame 12 relatively to the main frame 10.

In accordance with the invention, the main frame 10 is in the form of an inverted U, and in the preferred form, as best shown in FIGS. 3 and 4, the frame 10 is formed by a horizontal plate 17 and vertically extending side bars or struts 18 which are welded, or otherwise secured, to the transversely opposed edges of the horizontal plate 17 and diverge outwardly below the horizontal plate 17 to provide clearance for the combined steering and traction unit 11.

The upper ends of the side bars or struts 18 extend a slight distance above the horizontal plate 17, and openings 19 are provided in the upper ends which receive pivots 20 by which the upper links 13 are pivotally attached to the main frame 10. The lower ends of the side bars or struts 18 are similarly provided with openings 21 which receive pivots 22 by which the lower links 14 are pivotally attached to the main frame 10.

A crossplate 23 extends between the side bars or struts 18 and is welded, or otherwise secured, to the side bars or struts 18 and also to the horizontal plate 17. As best shown in FIG. 4, an eye member 23a is welded to the center of the crossplate 23 and receives a pivot 24 by which the lower end of the hydraulic ram 16 is pivoted to the main frame 10.

As best shown in FIG. 3, a hollow, cylindrical king post or bearing 25 is welded to the crossplate 17 and extends downwardly through the center of the crossplate 17. The portion of the king post 25 which extends below the crossplate 17 is received in upper and lower anti-friction bearings 26 and 27 which are mounted in a hollow, upper extension 28 of the combined steering and traction unit 11. The lower end 29 of the king post 25 is threaded and receives a nut or suitable retainer 30 to prevent separation of the steering and traction unit 11 from the king post 25, while allowing steering rotation of the steering and traction unit about the king post 25.

The steering and traction unit 11 is otherwise of conventional construction and includes a traction wheel 31, an electric drive motor 32 and a transmission, enclosed in a housing 33, through which the traction wheel 31 is driven by the electric drive motor 32. As best shown in FIG. 1, the combined steering and traction unit 11 is adapted to be rotated about the king post 25 to steer the traction wheel 31 by means of an elongated steering handle 34 which is pivotally attached at its lower end to the steering and traction unit 11 and is provided with suitable switches 35 adjacent the upper end for controlling operation of the motor 32.

The load lifting or elevating frame 12 is of generally conventional construction and includes channel shaped legs or forks 36 which are transversely spaced to permit their insertion into a pallet to be lifted. The legs or forks 36 are secured together at their forward ends by a vertically extended frame structure 37.

As shown in FIG. 1, the upper links 13 are pivotally connected to the vertical frame structure 37 of the load lifting frame 12 by means of pivots 38, and the lower links 14 are secured to pivot shafts 39 which are suitably journaled in the vertical frame structure 37 adjacent the lower end. A downwardly extending lever arm 40 is also secured to each of the pivot shafts 39 and each lever arm 40 is pivotally connected by a pivot 41 to one end of an elongated connecting link 42 which extends through each of the legs or forks 36. The opposite end of each of the elongated connecting links 42 is pivotally connected by means of a pivot 43 to a bell crank lever 44, which supports the roller 15 and which is pivotally attached to the fork 36 by means of a pivot 45.

A suitable housing 46 mounted on the load lifting frame 12 adjacent the vertical frame structure 37 encloses batteries (not shown) for supplying electrical energy for operating the electric drive motor 32. As shown in FIG. 1 a multiple conductor cable 47 for transmitting electrical energy from the batteries to the electric drive motor 32, and also for providing control circuits for the motor, extends from the housing 46 through the hollow king post 25 into the interior of the combined steering and traction unit for connection with the motor 32 and the switches 35 on the handle. A simple hood 48, which is secured to the vertical frame structure 37, extends over the upper end of the main frame 10 to protect and conceal the ram 16 and the conductor 47. An electric motor driven pump (not shown) for supplying fluid under pressure for operating the ram 16 is mounted in the vertical frame structure 37 of the elevating frame 12.

When utilizing the truck to pick up a palletized load, the legs or forks 36 are extended through the pallet while lifting frame 12 is in the lowered position as shown in FIG. 1. Fluid under pressure is then admitted to the hydraulic ram 16 to extend the ram 16 and cause the forward end of the load lifting frame 12 to be elevated relatively to the main frame 10. As the frame 12 is elevated, the upper and lower parallel supporting links 13 and 14 swing upwardly in a clockwise direction, as viewed in FIG. 4, around their pivots 20 and 21. At the same time, the lever arms 40, which are secured to the same pivot shafts 49 as the lower links 14, are rotated in a clockwise direction, thereby moving the connecting rods 42 to the left, as viewed in FIG. 4, causing the bell crank levers 44 to rotate in a counterclockwise direction and move the supporting rollers 15 downwardly, as the forward end of the lifting frame 12 is elevated. The palletized load is thereby lifted a few inches from the ground and may be transported by operation of the truck through the drive motor 32.

From the preceding description it can be seen that there is provided a very simple, inexpensive, but yet rugged construction, for a motorized hand truck which permits a motorized hand truck to be manufactured and sold at a price that is only slightly more than a non-motorized hand lift truck of conventional construction.

While one form of the invention has been shown and described, it will be appreciated that changes and modifications may be made therein without departing from the spirit and scope of the invention.

I now claim:

1. In a lift truck, an inverted U-frame, a vertical bearing secured to an upper end portion of said inverted U-frame, a steering and traction unit, means mounting said steering and traction unit on said bearing for supporting said U-frame while rotating relatively thereto for steering the truck and for moving the truck, a load lifting frame, upper and lower parallel links pivoting the forward end of said load lifting frame to each leg of said U-frame, means mounted at a point on said upper end portion of said U-frame and engaging the load lifting frame for swinging said load lifting frame in load lifting direction on said links relatively to said U-frame, load wheels under the rear end of said load lifting frame, and means for moving said load lifting wheels relatively to said load lifting frame as said load lifting frame swings on said links relatively to said U-frame.

2. In a lift truck, an inverted U-frame including a horizontal upper member and a pair of spaced downwardly extending legs, a downwardly extending vertical bearing secured to said horizontal upper member between said legs, a steering and traction unit, means mounting said steering and traction unit on said bearing for supporting said U-frame while rotating relatively thereto for steering the truck and for moving the truck, a load lifting frame, upper and lower parallel links pivoting the forward end of said load lifting frame to each leg of said U-frame, a hydraulic lift ram pivoted at one end to an upper end portion of said U-frame and at its other end to said load lifting frame and operable for swinging said load lifting frame in load lifting direction on said links relatively to said U-frame, load wheels under the rear end of said load lifting frame, and means for moving said load lifting wheels relatively to said load lifting frame as said load lifting frame swings on said links relatively to said U-frame.

3. In a lift truck, an inverted U-frame comprising a pair of struts extending downwardly from an upper horizontal connecting member, with each of said struts having upper portions projecting slightly above said connecting member, a downwardly projecting vertical bearing secured to said connecting member, a steering and traction unit, means mounting said steering and traction unit on said bearing for supporting said U-frame while rotating relatively thereto for steering the truck and for moving the truck, a load lifting frame, upper and lower parallel links pivoting the forward end of said load lifting frame for lifting movement on each strut of said U-frame with said upper links pivoted to the said upper projecting portions of said struts, a depending member secured to said horizontal connecting member and substantially aligned in a rearward direction relatively to the vertical bearing on which the steering and traction unit is mounted, a hydraulic lift ram pivoted to a central portion of said load frame and to said depending member and operable for swinging said load lifting frame in load lifting direction on said links relatively to said U-frame, load wheels under the rear end of said load lifting frame, and means for moving said load lifting wheels relatively to said load lifting frame as said load lifting frame swings on said links.

4. In a lift truck, a steering and traction unit having a traction wheel and motor for driving the traction wheel, an inverted U-frame including a pair of legs extending vertically in spaced relation to opposed sides of said steering and traction unit, an upper portion of said frame extending in position above the wheel and motor of said steering and traction unit between the frame legs, a lift ram of the kind having two opposed ends that are movable relatively to each other by hydraulic pressure, means supporting one end of said rim at a point on said upper portion of the U-frame, bearing means mounting the steering and traction unit for steering rotation on said frame upper portion, a load lifting frame arranged rearwardly of the U-frame, upper and lower links pivoted between the forward end portion of the load lifting frame and each leg of the U-frame, means whereby the other end of the lift ram engages the forward end portion of the load lifting frame for lifting that frame by swinging said links relatively to the U-frame, load wheels operable to lift the rearward portion of the load lifting frame, and means operating said load wheels as the lift ram lifts the load lifting frame on the links.

5. In a lift truck, a steering and traction unit having a traction wheel and motor for driving the traction wheel, an inverted U-frame including a pair of legs extending vertically in spaced relation to opposed sides of said steering and traction unit, an upper portion of said frame extending in position above the wheel and motor of said steering and traction unit between the frame legs, lift means having one end supported at a point on said upper portion of the U-frame, bearing means mounting the steering and traction unit for steering rotation on said frame upper portion, a load lifting frame arranged rearwardly of the U-frame, upper and lower links pivoted between the forward end portion of the load lifting frame and each leg of the U-frame, means whereby an opposed end of the lift means engages the forward end portion of the load lifting frame for lifting that frame by swinging said links relatively to the U-frame, load wheels operable to lift the rearward portion of the load lifting frame, and means operating said load wheels as the lift means lift the load lifting frame on the links.

6. In a lift truck, a steering and traction unit having a traction wheel and drive means for driving the traction wheel, said drive means being relatively wide so as to require considerable clearance during steering rotation of the steering and traction unit, an inverted U-frame including a pair of legs extending vertically in spaced relation to opposed sides of said steering and traction unit, an upper portion of said frame extending in position above the wheel and drive means of said steering and traction unit between the frame legs and allowing the clearance necessary for said drive means, lift means mounted in upwardly extending position at a point on said upper portion of the U-frame, bearing means mounting the steering and traction unit for steering rotation on said frame upper portion, a load lifting frame arranged rearwardly of the U-frame, upper and lower links pivoted between the forward end portion of the load lifting frame and each leg of the U-frame, means whereby the lift means engage the forward end portion of the load lifting frame for lifting that frame by swinging said links relatively to the U-frame, load wheels operable to lift the rearward portion of the load lifting frame, and means operating said load wheels as the lift means lift the load lifting frame on the links.

7. In a lift truck of the class having a forward frame, a steering and traction unit mounted for steering rotation on the forward frame and including a traction wheel and a motor for driving said wheel, a rearward load lifting frame, pairs of links pivoted between the frames, a hydraulic lift ram having opposed ends acting between the frames for lifting the rearward frame on the links relatively to the forward frame, and load wheels lifting the rearward frame relatively to the ground as that frame is lifted on the links, the improvement that comprises an inverted U-frame forming the forward frame of the truck, said U-frame including a pair of legs extending vertically in spaced relation to opposed sides of the steering and traction unit, each leg having pivoted to it one pair of said links, an upper portion of the U-frame extending in position above the wheel and motor of the steering and traction unit between the legs of the U-frame, bearing means supporting the steering and traction unit for steering rotation on said upper portion of the U-frame, and means supporting one end of said lift ram at a point on said upper portion of the U-frame that is substantially aligned in a rearward direction relatively to the bearing means on which the steering and traction unit is steered.

References Cited by the Examiner

UNITED STATES PATENTS

| 2,325,396 | 7/1943 | Hastings | 180—13 |
| 2,358,957 | 9/1944 | Barrett | 280—43.12 X |
| 2,417,496 | 3/1947 | Framhein | 254—2.6 |
| 2,538,680 | 1/1951 | Framhein | 254—2.6 |
| 2,598,151 | 5/1952 | Warshaw | 254—2.6 |
| 2,789,648 | 4/1957 | Huffman | 280—43.12 X |

FOREIGN PATENTS

| 503,524 | 6/1951 | Belgium. |
| 760,412 | 10/1956 | Great Britain. |

BENJAMIN HERSH, *Primary Examiner.*

C. C. PARSON, *Assistant Examiner.*